United States Patent
Akiba et al.

[11] Patent Number: 5,694,769
[45] Date of Patent: Dec. 9, 1997

[54] LIQUID OXIDIZER IMMERSION TYPE HYBRID ROCKET

[75] Inventors: Ryojiro Akiba, Hachioji; Nobuhiro Tanatsugu, Uenohara-machi; Masahiro Kohno, Yokohama; Rikio Yokota, Iruma, all of Japan

[73] Assignee: The Director-General of The Institute of Space and Astronautical Science, Sagamihara, Japan

[21] Appl. No.: 439,121

[22] Filed: May 11, 1995

[30] Foreign Application Priority Data

Sep. 22, 1994 [JP] Japan ................. 6-228136

[51] Int. Cl.⁶ ........................................ F02K 9/70
[52] U.S. Cl. ............................... 60/251; 60/253
[58] Field of Search ................... 60/251, 253, 257

[56] References Cited

U.S. PATENT DOCUMENTS 3,159,104  12/1964  Hodgson ..................... 60/251
3,203,174  8/1965   Sutherland .................. 60/251

OTHER PUBLICATIONS

Flittie, K.J., et al., "Hybrid Booster Strap–Ons for the Next Generation Launch System", AIAA 93–2269, AIAA/SAE/ASME/ASEE 29th Joint Propulsion Conference and Exhibit, Jun. 28–30, 1993/Monterey, CA.

McFarlane, J.S., et al., "Design and Testing of AMRCO's 250,000 lbf Thrust Hybrid Motor", AIAA 93–2551, AIAA/SAE/ASME/ASEE 29th Joint Propulsion Conference and Exhibit, Jun. 28–30, 1993/Monterey, CA.

Goldberg, B., et al., "Preliminary Results of NASA/Industry Hybrid Propulsion Program", AIAA 92–3299, AIAA/SAE/ASME/ASEE 28th Joint Propulsion Conference and Exhibit, Jul. 6–8, 1992/Nashville, TN.

*Primary Examiner*—Michael Koczo
*Attorney, Agent, or Firm*—Oblon, Spivak, McClelland, Maier & Neustadt, P.C.

[57] ABSTRACT

A liquid oxidizer immersion hybrid rocket having a combustion chamber, a porous fuel material placed in the combustion chamber, a liquid oxidizer filled into pores of the porous fuel material, and two holding plates provided in the combustion chamber so as to hold opposite ends of the porous fuel material respectively. The porous fuel material comprises a large number of layers stacked one another in an axial direction of the combustion chamber.

3 Claims, 3 Drawing Sheets

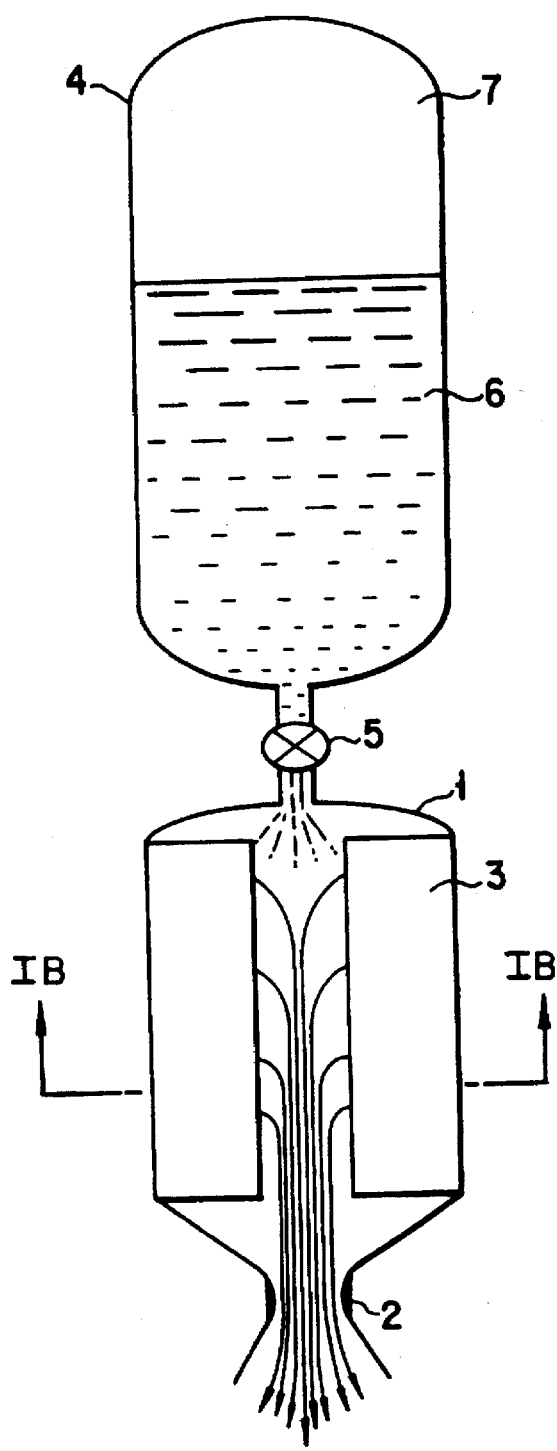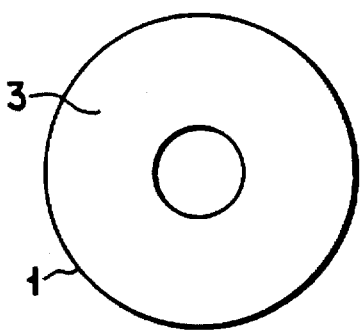
FIG. 1A
PRIOR ART
FIG. 1B
PRIOR ART

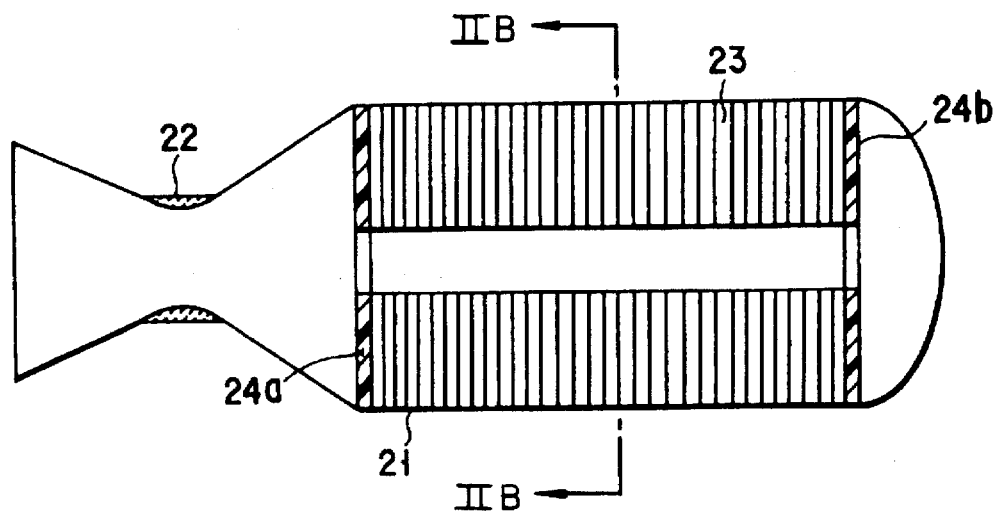
F I G. 2A
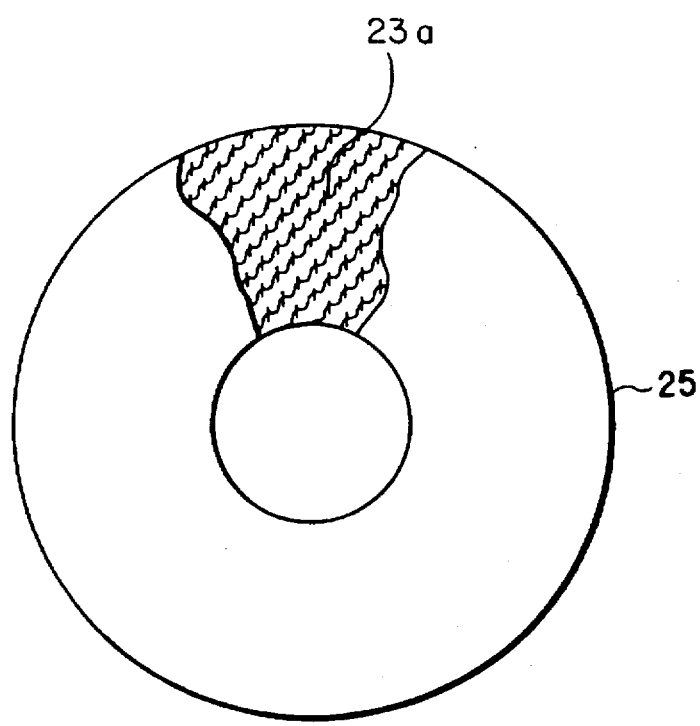
F I G. 2B

1

LIQUID OXIDIZER IMMERSION TYPE HYBRID ROCKET

BACKGROUND OF THE INVENTION

1. Field of the Invention

The present invention relates to a liquid-oxidizer-immersion type hybrid rocket.

2. Description of the Related Art

A hybrid rocket is safe in production and transportation since its oxidizer is contained in a separate container until the start of the operation. In particular, solid fuel is made of plastics of general purpose (for example, polyethylene) and therefore the fuel cannot be spilled or diffused. Further, solid fuel is not flammable. Thus, solid fuel is a very safe material. With regard to the hybrid rocket, there is a wide range of combinations between oxidizers and fuels, and it is possible to prepare a high performance combination at low cost.

However, the conventional type hybrid rocket has a more complicated structure than a solid-propellant rocket. In terms of simplicity, a hybrid rocket in which the oxidizer is supplied by a pressure feed system shown in FIGS. 1A and 1B, is recommended. FIG. 1A is a cross section of an entire rocket, and FIG. 1B is a cross section taken along the line IB—IB in FIG. 1A.

As shown in FIG. 1A, a nozzle 2 is provided below a combustion chamber 1, and a solid fuel 3 having a cylindrical shape is placed in the combustion chamber 1. A tank 4 is connected to the combustion chamber 1 via a valve 5. A liquid oxidizer 6 and a pressurant gas 7 are contained in the tank 4.

The hybrid rocket shown in FIG. 1A has a structure in which the liquid oxidizer 6 is supplied by the pressure feed system, and the ratio of the mass of the structure to that of the fuel is large, resulting in a disadvantageous mass ratio.

Meanwhile, in essence, the combustion occurs along with a large-scale mixing process which takes place within the boundary layer of a fuel surface, and therefore the problem of an incomplete combustion rises.

Further, it is difficult to make constant the consumption rate (linear burning rate) of the fuel due to the occurrence of combustion along the flow of the internal burning surface as shown in FIG. 1. As a result, the fuel cannot usually be used up completely, which causes a degradation of the mass ratio in practice.

Some of the examples of the conventional hybrid rocket are discussed in the following documents:

(i) Flittie, K. J., and McKinney, "Hybrid Booster Strap-Ons for the Next Generation Launch System," AIAA 93-2269, AIAA/SAE/ASME/ASEE 29th Joint Propulsion Conference and Exhibit, Jun. 28–30, 1993/Monterey, Calif.;

(ii) McFarlane, J. S., Kniffen, R. J., and Lichatowich, J., "Design and Testing of AMRCO's 250,000 lbf Thrust Hybrid Motor," AIAA 93-2551, AIAA/SAE/ASME/ASEE 29th Joint Propulsion Conference and Exhibit, Jun. 28–30, 1993/Monterey, Calif.; and (iii) Goldberg, B., and Cook, J., "Preliminary Results of NASA/Industry Hybrid Propulsion Program," AIAA 92-3299, AIAA/SAE/ASME/ASEE 28th Joint Propulsion Conference and Exhibit, Jul. 6–8, 1992/Nashville, Tenn.

SUMMARY OF THE INVENTION

The object of the present invention is to provide a liquid oxidizer immersion type hybrid rocket which can achieve a mass ratio as high as the solid rocket and a better specific impulse than the solid rocket, while maintaining all the characteristics of the conventional hybrid rocket, except for thrust termination characteristics.

According to the present invention, there is provided a liquid oxidizer immersion type hybrid rocket comprising: a combustion chamber having an aft end on which a nozzle is mounted, and an internal section containing a cylindrical porous fuel material, the pores of which are soaked with a liquid oxidizer.

According to the present invention, there is further provided a liquid oxidizer immersion type hybrid rocket capable of achieving a mass ratio as high as the solid rocket and a better specific impulse than that of the solid rocket, while maintaining all the characteristics of the conventional hybrid rocket, except for thrust termination characteristics, and having all the necessary characteristics of a desirable space transportation system, such as low cost, high degree of safety, low pollution and a high performance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are explanatory diagrams of a conventional hybrid rocket, FIG. 1A showing a conceptual view of the rocket and FIG. 1B showing a cross section taken along the line IB—IB in FIG. 1A;

FIGS. 2A and 2B are explanatory diagrams of a liquid oxidizer immersion type hybrid rocket according to the first embodiment of the present invention, FIG. 2A showing a conceptual view thereof and FIG. 2B showing a partially cut-out cross section taken along the line IIB—IIB in FIG. 2A;

DETAILED DESCRIPTION OF THE PREFERRED EMBODIMENTS

An example of the porous fuel material of the present invention is made by putting a large number of woven fabrics made of fibers or films having irregular surfaces one on another in a combustion chamber in its axial direction. In this case, both sides of the porous fuel material should preferably be held by two holding plates in the fuel chamber. Another example of the porous fuel fabric material is made by laying a great number of fabrics or string-like films as in a tobacco filter, and arranging them in the combustion chamber in its axial direction. It should be noted that the fibers of the fuel material may be arranged as an unwoven fabric in a cotton wool manner.

Examples of the material for the fiber are organic plastics such as polyethylene, polypropylene, polyamide, polyester and rayon.

An example of the liquid oxidizer is liquefied oxygen. With regard to a large-sized rocket, when an excessive water head difference may drive fluid motion of the oxidizer in the pores of the fuel due to the gravity or acceleration while flying, the capillary flow may be adversely affected. Therefore, if necessary, a film should be inserted between accumulated layers so as to block the capillary flow, or the load applied due to the acceleration must be released to the outer wall of the combustion chamber.

In the present invention, it is also possible that fine wires or thin films of aluminum may be mixed into the fuel material or deposited on the film surface. The effect of aluminium is to raise the combustion temperature of and to increase the density of the material as a propellant.

When the porous combustion material is soaked with the liquid oxygen, the liquid oxygen is poured gradually with the nozzle being held up, while monitoring the soaking of the pours of fabrics from below. In this case, the remaining moisture and nitrogen gas cause an adverse influence, and therefore it is effective to carry out the process by repeating evacuation and oxygen feed, for a complete immersion. Further, an excessive portion of the liquid should be removed after the soaking and immersion of the material with the liquid is completed and the thermal equilibrium is fully obtained. After the removal of the excessive liquid, it is preferable that the fuel material must be ignited and burned before the oxidizer in the fuel is vaporized. The ignition will be carried out from the nozzle side by a solid ignition motor.

Figure 4:
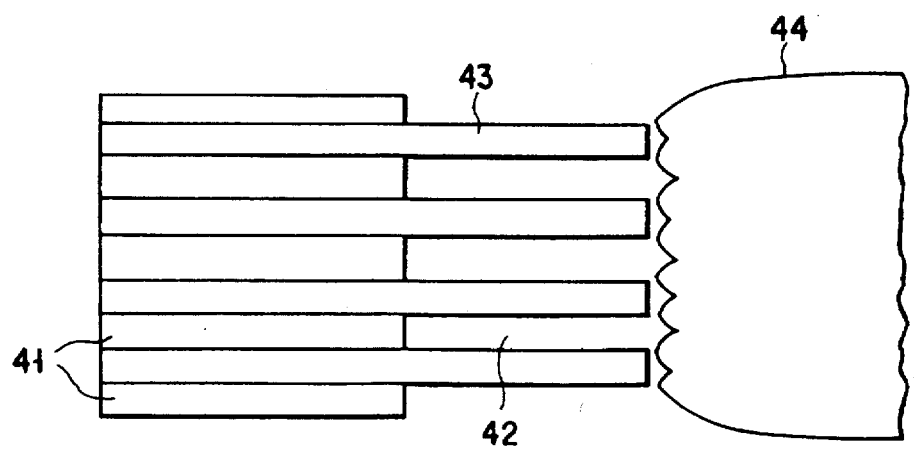
FIG. 4 is an explanatory figure of a combustion process of the liquid oxidizer immersion type hybrid rocket according to the first embodiment.

The combustion process occurs as illustrated in FIG. 4. FIG. 4 shows an oxidizer 41 (liquid), an oxidizer 42 (liquid), fuel fibers 43 and flame 44. In the immersion state of the liquid oxidizer, the oxidizer and the fuel should be fully mixed, and therefore the combustion is completed at a section very close to the surface of the fuel, thereby achieving a high combustion efficiency. Thus, no fuel remains after combustion. In order to abort the operation in the preparation phase heat is applied from outside to release the oxidizer in the form of vapor, and the reduction of pressure and the supply of nitrogen gas are repeated, thus recovering the safe state.

DESCRIPTION OF THE PREFERRED EXAMPLES

Examples of the present invention will now be described with reference to drawings.

(Example 1)

Example 1 will be described with reference to FIGS. 2A and 2B. FIG. 2A is a cross section of a liquid oxidizer immersion type hybrid rocket according to Example 1, and FIG. 2B shows a partially cut-out cross section taken along the line IIB—IIB in FIG. 2A.

A nozzle 22 is mounted on the aft portion of a combustion chamber 21. A cylindrical porous fuel material 23 is placed in the combustion chamber 21 with both ends of the material held between donut-shaped holding plates 24a and 24b. The porous fuel material 23 has a structure in which a great number of woven or unwoven fabrics 23a made of polyethylene etc, are put one on another in the combustion chamber 25 in its axial direction. Liquid oxygen 25 serving as a liquid oxidizer is poured into pores of the porous fuel material 23.

In the porous fuel material 23, it is required that the distance between adjacent fabrics be adjustable by the surface pressure while the adjacent fabrics are in contact with each other. Such adjustment can be achieved by changing the distance between the hold plates 24a and 24b and the number of woven or unwoven fabrics.

When the porous fuel material 23 is soaked with the liquefied oxygen 25, the liquefied oxygen 25 is poured gradually into the pores of the fabrics 23 from below, with the nozzle 22 held up, while monitoring the soaking state. Since the remaining moisture and nitrogen gas is expected to cause an adverse influence, it is effective to repeat evacuation and oxygen feed during the liquid pouring process, for a complete immersion. Further, an excessive portion of the liquid should be removed after the soaking and immersion of the material with the liquid is completed and the thermal equilibrium is fully obtained. After the removal of the excessive liquid, it is preferable that the fuel material must be ignited and burned before the oxidizer is vaporized. The ignition would be carried out from the nozzle side by a solid ignition motor.

In the liquid oxidizer immersion type hybrid rocket according to the present invention, the cylindrical porous fuel material 23 held between the hold plates 24a and 24b is placed in the combustion chamber 21 having the nozzle 22 set on its aft end, and the pores of the porous fuel material 23 are soaked with the liquid oxygen 25. The hybrid rocket having such a structure exhibits the following advantages.

(1) Since the parts of the rocket can be handled as ordinary materials, a safe operation can be achieved.

(2) Since the structural elements can be designed common to a variety of shapes and sizes, the degree of freedom of design can be maintained, and a high and a large place is not necessary to assemble the rocket. Therefore, the present invention has a higher flexibility than that of the conventional hybrid rocket.

(3) The fuel can be made in a variety of shapes from materials of everyday life, and therefore the production cost can be significantly reduced.

(4) A high combustion efficiency and a simple structure, which is impossible to be expected in the conventional hybrid rocket, can be achieved. This is an essential factor for achieving a high specific impulse and a high mass ratio.

(Example 2)

Figure 3A:
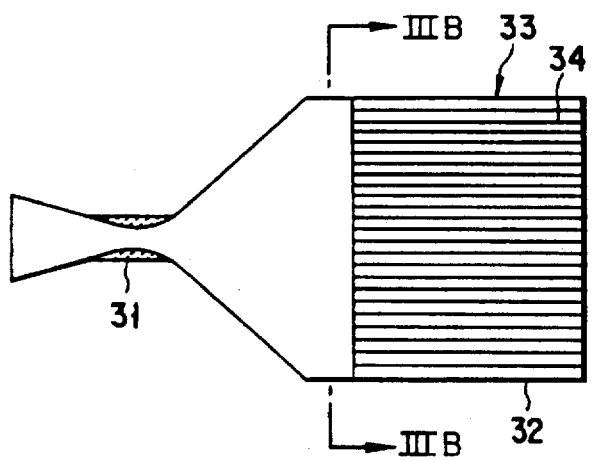
FIGS. 3A and 3B are explanatory diagrams of a liquid oxidizer immersion type hybrid rocket according to the second embodiment, FIG. 3A showing a conceptual view thereof and FIG. 3B showing a partially cut-out cross section taken along the line IIIB—IIIB in FIG. 3A.
Figure 3B:
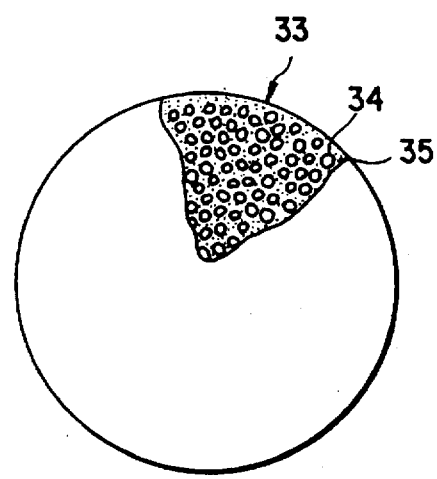

Example 2 will be described with reference to FIGS. 3A and 3B. FIG. 3A is a cross section of a liquid oxidizer immersion type hybrid rocket according to Example 2, and FIG. 3B shows a partially cut-out cross section taken along the line IIIB—IIIB in FIG. 3A.

In the liquid oxidizer immersion type hybrid rocket according to Example 2, a porous fuel material 34 made by putting a great number of fuel fabrics 33 one on another in the tobacco filter manner in the axial direction of the combustion chamber 32 is placed in the combustion chamber 32. The cavities between the fuel fabrics 33 which constitute the porous fuel material 34 are soaked with the liquid oxygen 35.

With this structure, the same advantage as that of Example 1 can be obtained.

Examples 1 and 2 were described in connection with the case where liquid oxygen was used as the liquid oxidizer; however the present invention is not limited to such a case.

Further, Example 1 was described in connection with the case where the porous fuel material has a structure in which a great number of woven fabrics are put one on another, and Example 2 was described in connection with the case where the porous fuel material has a tobacco filter-like structure. However, the present invention is not limited to such cases, and the structure of the fuel material may be of an arbitrary combination of the above cases. For example, with fibers having random orientations, the same effect as that of the above-described embodiment can be obtained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid oxidizer immersion hybrid rocket comprising:

a combustion chamber;

a porous fuel material having pores and placed in said combustion chamber, said porous fuel material including opposite ends;

a liquid oxidizer filled into the pores of said porous fuel material;

two holding plates provided in said combustion chamber so as to hold the opposite ends of said porous fuel material respectively; and said porous fuel material comprising a large number of layers stacked or one another in an axial direction of said combustion chamber.

2. The liquid oxidizer immersion hybrid rocket according to claim 1, wherein said layers are unwoven fabrics.

3. The liquid oxidizer immersion hybrid rocket according to claim 1, wherein said layers are woven fabrics.

* * * * *